(12) United States Patent
Okamura et al.

(10) Patent No.: US 10,895,638 B2
(45) Date of Patent: Jan. 19, 2021

(54) RADAR DETECTION SYSTEM AND RADAR DETECTION METHOD

(71) Applicant: Panasonic Intellectual Property Management Co., Ltd., Osaka (JP)

(72) Inventors: Shutai Okamura, Osaka (JP); Takeshi Hatakeyama, Osaka (JP); Takahiro Yamaguchi, Osaka (JP); Tsutomu Uenoyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 204 days.

(21) Appl. No.: 15/901,102

(22) Filed: Feb. 21, 2018

(65) Prior Publication Data

US 2019/0079183 A1 Mar. 14, 2019

Related U.S. Application Data

(60) Provisional application No. 62/557,150, filed on Sep. 12, 2017.

(51) Int. Cl.
| | |
|---|---|
| *G01S 13/933* | (2020.01) |
| *G06K 9/32* | (2006.01) |
| *G06K 9/00* | (2006.01) |
| *G01S 13/931* | (2020.01) |
| *G01S 7/00* | (2006.01) |
| *G01S 13/934* | (2020.01) |

(52) U.S. Cl.
CPC .......... *G01S 13/933* (2020.01); *G01S 13/931* (2013.01); *G06K 9/00805* (2013.01); *G06K 9/3241* (2013.01); *G01S 7/003* (2013.01); *G01S 13/934* (2020.01); *G01S 2013/932* (2020.01); *G01S 2013/9316* (2020.01)

(58) Field of Classification Search
CPC .... G01S 13/933; G01S 13/931; G01S 13/934; G01S 2013/932; G01S 2013/9316; G01S 7/003; G06K 9/00805; G06K 9/3241
USPC .......................................................... 342/29
See application file for complete search history.

(56) References Cited

U.S. PATENT DOCUMENTS

| | | | |
|---|---|---|---|
| 6,512,976 B1* | 1/2003 | Sabatino | G01C 21/005 342/357.36 |
| 9,581,692 B2* | 2/2017 | Lamkin | G08G 5/0021 |
| 2011/0057830 A1* | 3/2011 | Sampigethaya | G01S 5/0072 342/36 |
| 2011/0221624 A1* | 9/2011 | Kavaler | G01S 7/003 342/22 |

(Continued)

*Primary Examiner* — Frank J McGue

(74) *Attorney, Agent, or Firm* — Wenderoth, Lind & Ponack, L.L.P.

(57) ABSTRACT

A radar detection system according to the present disclosure is a radar detection system that detects an obstacle to an aircraft in an airport. The radar detection system includes a radar apparatus, and a control apparatus. The radar apparatus detects an obstacle by transmitting and receiving a radar signal, and acquires obstacle information regarding the obstacle detected based on the received radar signal. The control apparatus switches the operation of the radar apparatus according to the aircraft state of the aircraft. The control apparatus turns off the radar apparatus when the aircraft takes off, and turns on the radar apparatus when the aircraft makes a landing.

10 Claims, 29 Drawing Sheets

(56) References Cited

U.S. PATENT DOCUMENTS

| | | | | |
|---|---|---|---|---|
| 2013/0321192 A1* | 12/2013 | Starr | .................. | G01S 7/04 |
| | | | | 342/29 |
| 2014/0062755 A1* | 3/2014 | Kabrt | .................. | G01S 7/003 |
| | | | | 342/27 |
| 2014/0142838 A1* | 5/2014 | Durand | .................. | G08G 5/04 |
| | | | | 701/301 |

* cited by examiner

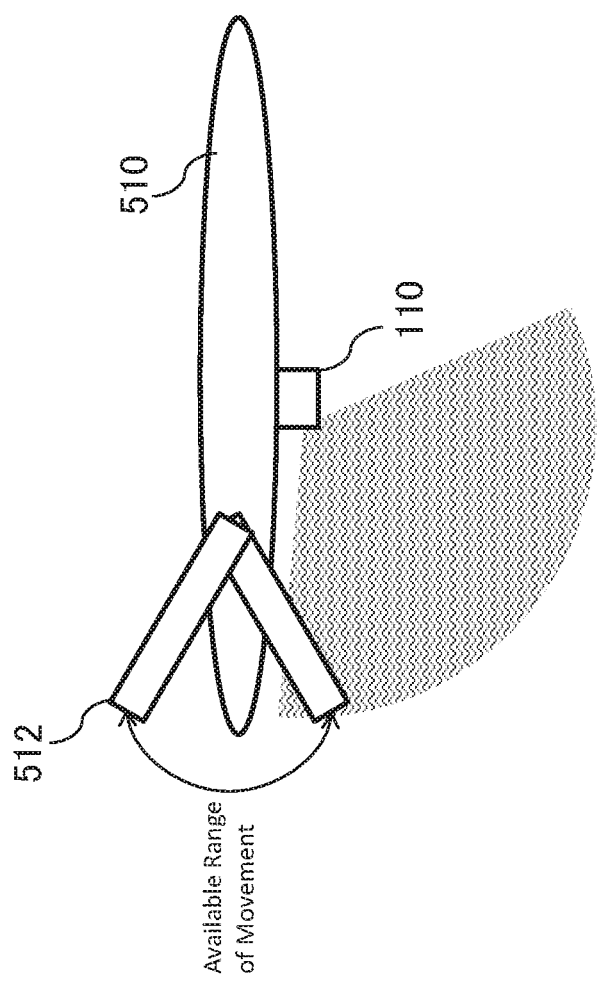

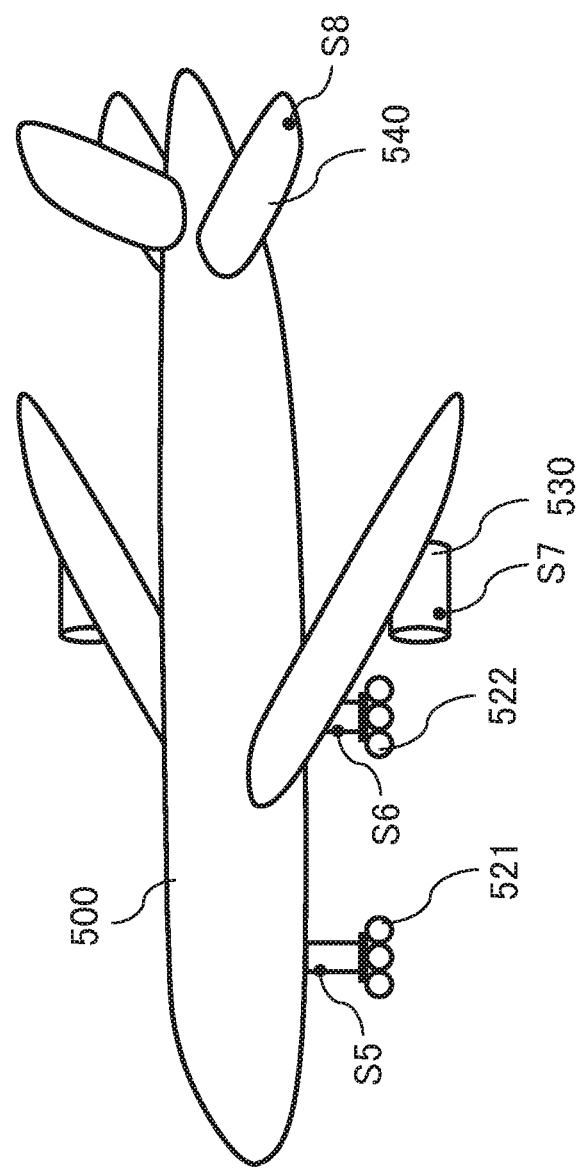

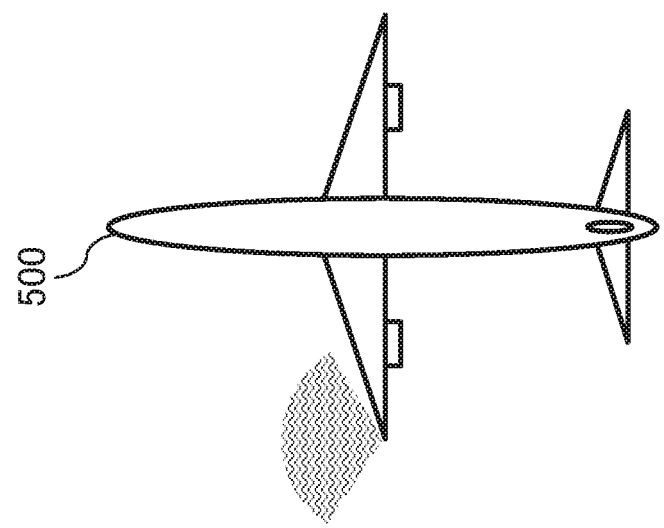

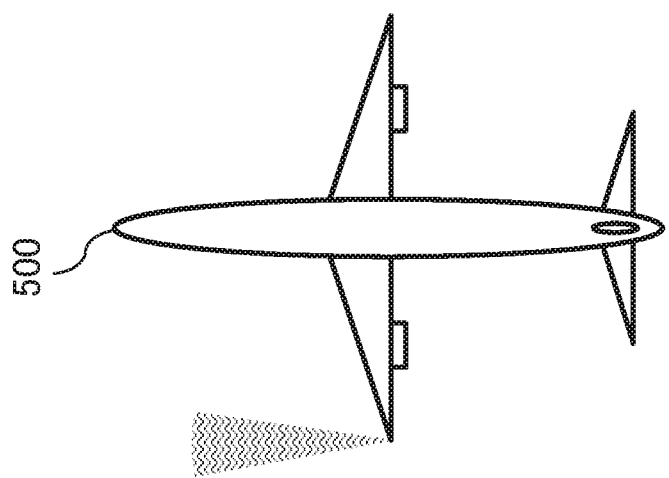

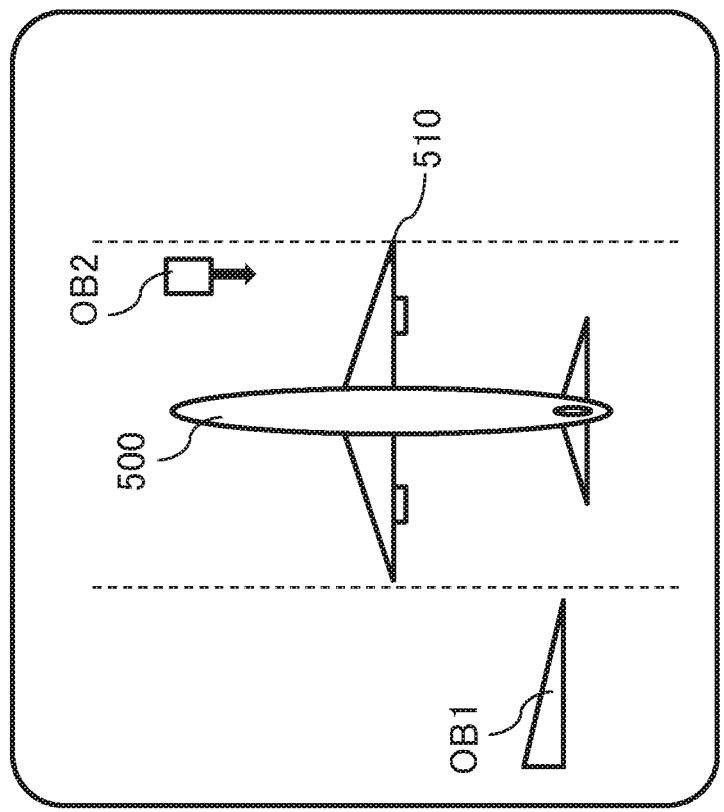

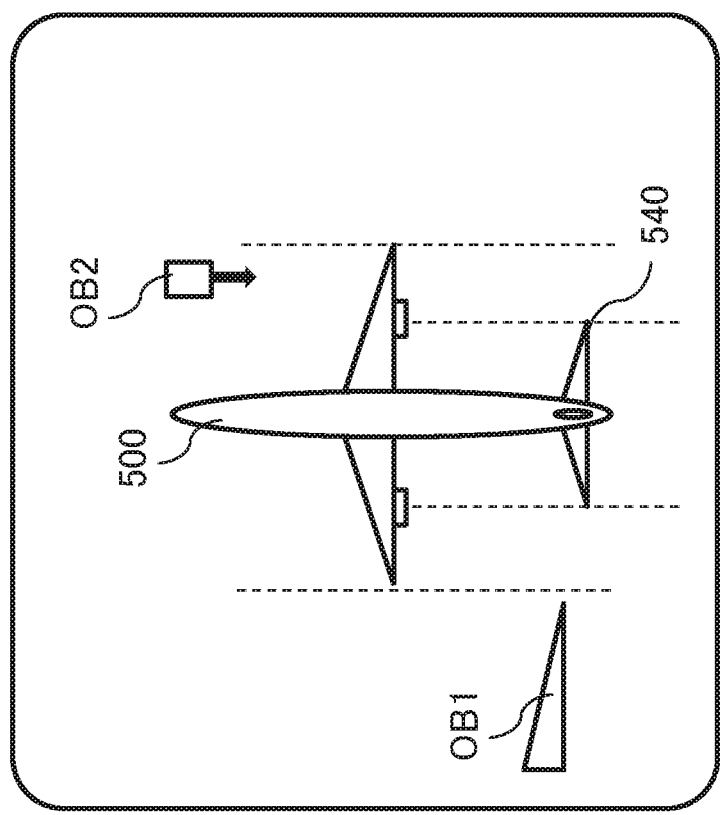

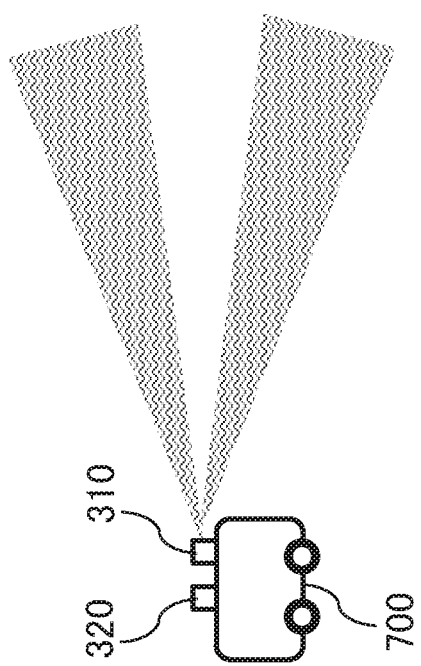

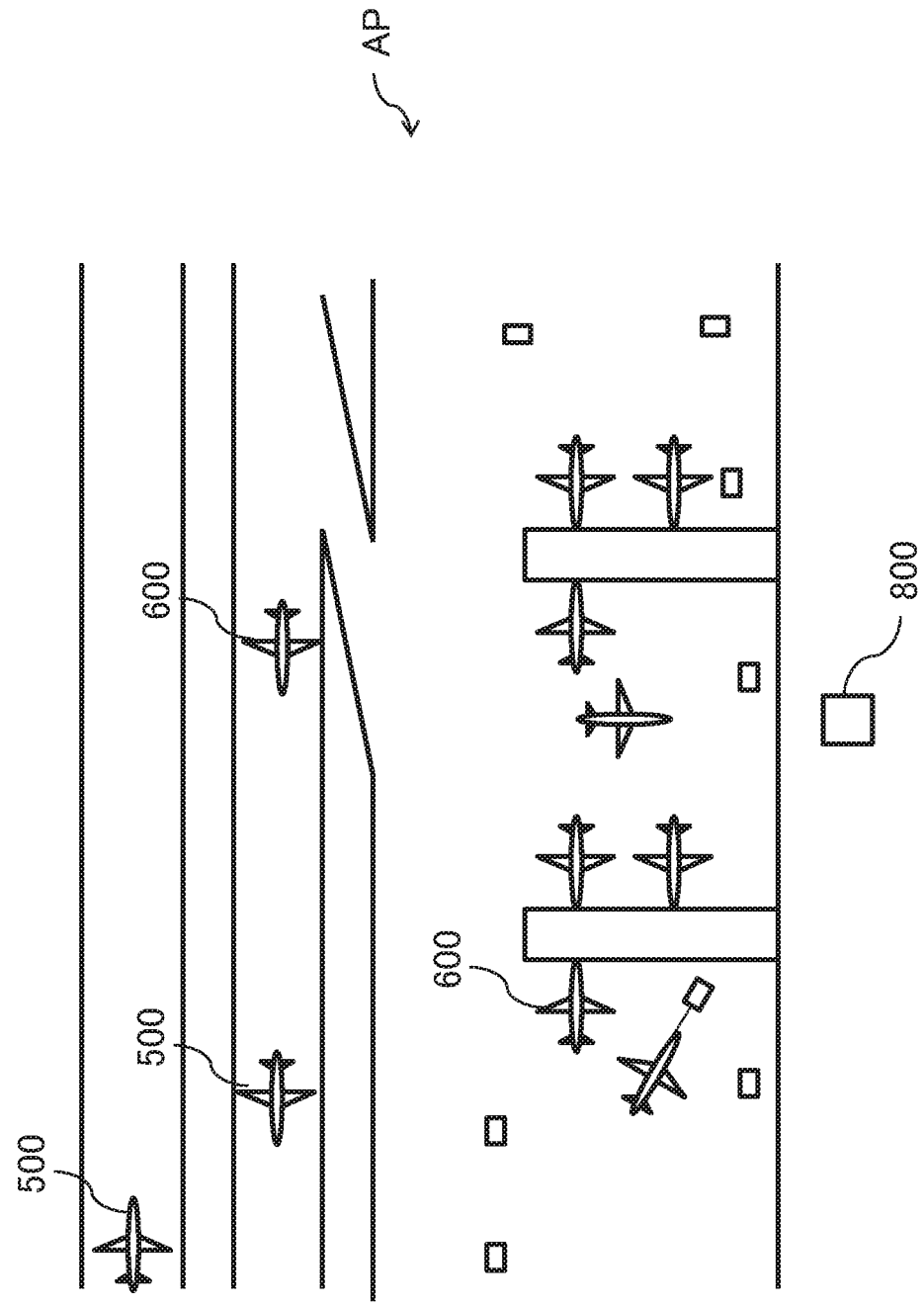

RADAR DETECTION SYSTEM AND RADAR DETECTION METHOD

CROSS-REFERENCE TO RELATED APPLICATIONS

This patent application claims the benefit of U.S. Provisional Patent Application 62/557,150, filed Sep. 12, 2017, the disclosure of which is incorporated herein by reference.

BACKGROUND

Technical Field

The present disclosure relates to a radar detection system and a radar detection method that detect an obstacle to aircraft in an airport.

Description of the Related Art

In an airport, accidental contact of a taxiing aircraft with an obstacle occurs frequently. As used herein, the term "obstacle" encompasses other parking or taxiing aircraft, ground service equipment (GSE) such as a cargo cart and a towing car, and foreign objects such as a metal object on a taxiway or a runway. Such accidental contact results in not only direct costs such as costs for repairing broken machinery, but also indirect costs such as costs for delayed flights and machinery replacement.

Under the circumstances, there is a growing demand for a system that detects an obstacle. Conventionally, a radar detection apparatus that detects an obstacle is installed at the side of a runway or a taxiway in an airport. However, such a radar detection apparatus may not be able to detect an obstacle due to blind spots in the radar coverage.

SUMMARY

It is an object of the present disclosure to provide a radar detection system and a radar detection method that detect an obstacle to an aircraft in an airport.

A radar detection system disclosed herein is a radar detection system that detects an obstacle in an airport, and the detecting system includes a radar apparatus, and a control apparatus. The radar apparatus detects an obstacle by transmitting and receiving a radar signal, and acquires obstacle information regarding the obstacle detected based on the received radar signal. The control apparatus switches the operation of the radar apparatus according to the aircraft state of aircraft. The control apparatus turns off the radar apparatus when the aircraft takes off, and turns on the radar apparatus when the aircraft makes a landing.

A radar detection method disclosed herein is a radar detection method that detects an obstacle to an aircraft in an airport. The radar detection method includes: detecting an obstacle by transmitting and receiving a radar signal; acquiring obstacle information regarding the obstacle detected based on the received radar signal; and turning off the transmission and reception of the radar signal when the aircraft takes off and turning on the transmission and reception of the radar signal when the aircraft makes a landing.

The radar detection system and the radar detection method that are disclosed herein are effective to detect an obstacle to an aircraft in an airport.

BRIEF DESCRIPTION OF THE DRAWINGS

FIG. 7 is a schematic diagram showing the arrangement of the radar apparatus and a slat.

FIG. 8 is a schematic diagram showing examples of installation positions where the radar apparatus can be installed.

FIG. 9A is a schematic diagram showing an example of directivity of the radar apparatus.

FIG. 9B is a schematic diagram showing an example of directivity of the radar apparatus.

FIG. 11B is a schematic diagram showing an example of a display form of the display apparatus.

FIG. 11D is a schematic diagram showing an example of a display form of the display apparatus.

FIG. 18 is a schematic diagram showing an example of directivity of the radar apparatus.

FIG. 19 is a schematic diagram showing a configuration of an airport.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1. Embodiment 1

1-1. Radar Detection System

Figure 1:
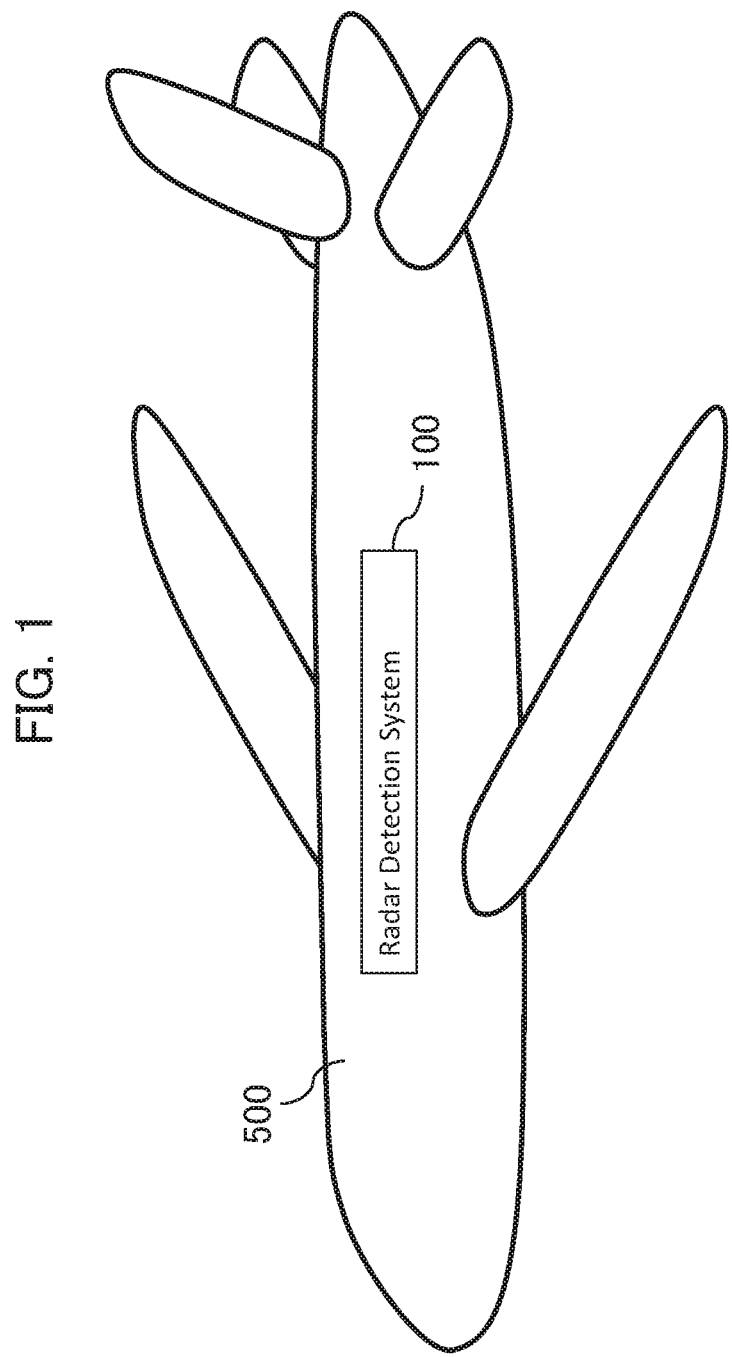
FIG. 1 is a schematic diagram showing a configuration of an aircraft.

A configuration of an aircraft 500 will be described with reference to FIG. 1.

The aircraft 500 includes a radar detection system 100. The radar detection system 100 is a system that detects an obstacle in an airport. As used herein, the term "obstacle" encompasses other parking or taxiing aircraft, ground service equipment (GSE) such as a cargo cart and a towing car, and foreign objects such as a metal object on a taxiway or a runway.

Figure 2:
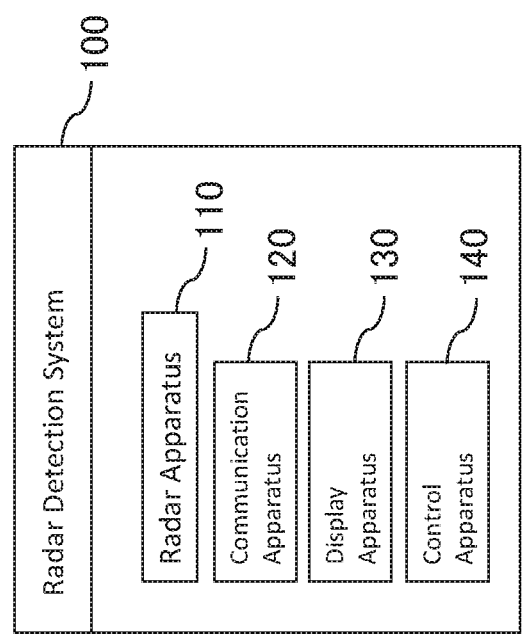
FIG. 2 is a block diagram showing a configuration of a radar detection system according to Embodiment 1.

A configuration of the radar detection system 100 will be described with reference to FIG. 2.

The radar detection system 100 includes a radar apparatus 110, a communication apparatus 120, a display apparatus 130, and a control apparatus 140. The radar apparatus 110, the communication apparatus 120, the display apparatus 130, and the control apparatus 140 are connected to each other through a wired or wireless communication line.

The radar apparatus 110 detects an obstacle by transmitting and receiving a radar signal, and acquires obstacle information regarding the obstacle detected based on the received radar signal. The obstacle information includes information such as the position of the obstacle with respect to the radar apparatus 110, the distance from the radar apparatus 110 to the obstacle, the size of the obstacle, and the speed of the obstacle.

The communication apparatus 120 performs wireless communication with external equipment that is provided external to the aircraft 500 such as other aircraft, GSE, and the control tower.

The display apparatus 130 converts the information detected by the radar apparatus 110 into a human perceivable format, and displays the information.

The control apparatus 140 is a processor or a circuit that executes processing in accordance with a predetermined program, and performs control so as to manage electronic devices included in the aircraft 500 and manage (obtain and store) the aircraft state. The aircraft state includes at least: the following states of the aircraft 500 such as landing, in-flight, parking, taxiing, and running; the moving speed of the aircraft 500; and the altitude of the aircraft 500.

Figure 3:
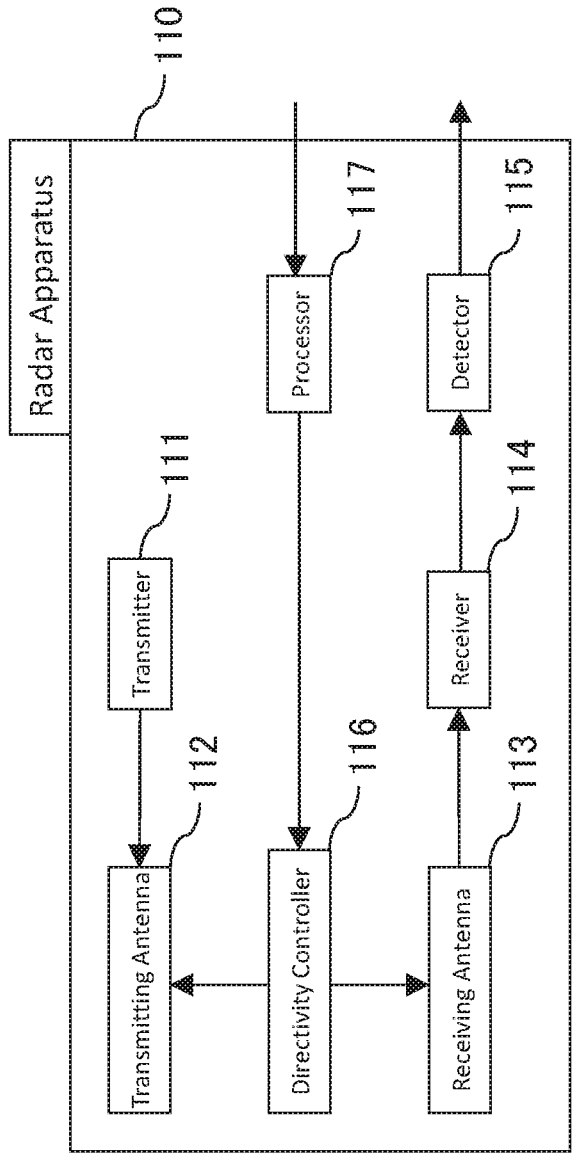
FIG. 3 is a block diagram showing a configuration of a radar apparatus according to Embodiment 1.

A configuration of the radar apparatus 110 will be described with reference to FIG. 3.

The radar apparatus 110 includes a transmitter 111, a transmitting antenna 112, a receiving antenna 113, a receiver 114, a detector 115, a directivity controller 116, and a processor 117.

The transmitter 111 generates a radar transmission signal. The transmitter 111 controls transmission parameters such as transmitting power, frequency, and directivity. The transmitter 111 uses, as the frequency band, for example, a millimeter wave band of 79 GHz, which is used for onboard radar. In the present embodiment, a wide band of 4 GHz is used, and it is therefore possible to obtain high-resolution radar information.

The transmitting antenna 112 is an antenna that transmits the radar transmission signal generated by the transmitter 111. As the transmitting antenna 112, it is possible to use, for example, a non-directional antenna, a directional antenna, an array antenna that includes a plurality of antenna elements, or the like.

The receiving antenna 113 is an antenna that receives a signal (hereinafter, referred to as "reception signal") that has been reflected by the obstacle and transmitted from the transmitting antenna 112. As the receiving antenna 113, it is possible to use, for example, a non-directional antenna, a directional antenna, an array antenna that includes a plurality of antenna elements, or the like.

The receiver 114 decodes the reception signal received by the receiving antenna 113, and acquires receiving power and receiving frequency.

The detector 115 acquires obstacle information based on the receiving power and the receiving frequency acquired by the receiver 114.

The directivity controller 116 controls the directivity patterns of the transmitting antenna 112 and the receiving antenna 113 based on a control signal from the processor 117.

The processor 117 performs processing of receiving a signal from the control apparatus 140, and processing of transmitting a signal to the control apparatus 140. The processor 117 transmits, to the directivity controller 116, a directivity control signal included in the signal from the control apparatus 140.

Figure 4:
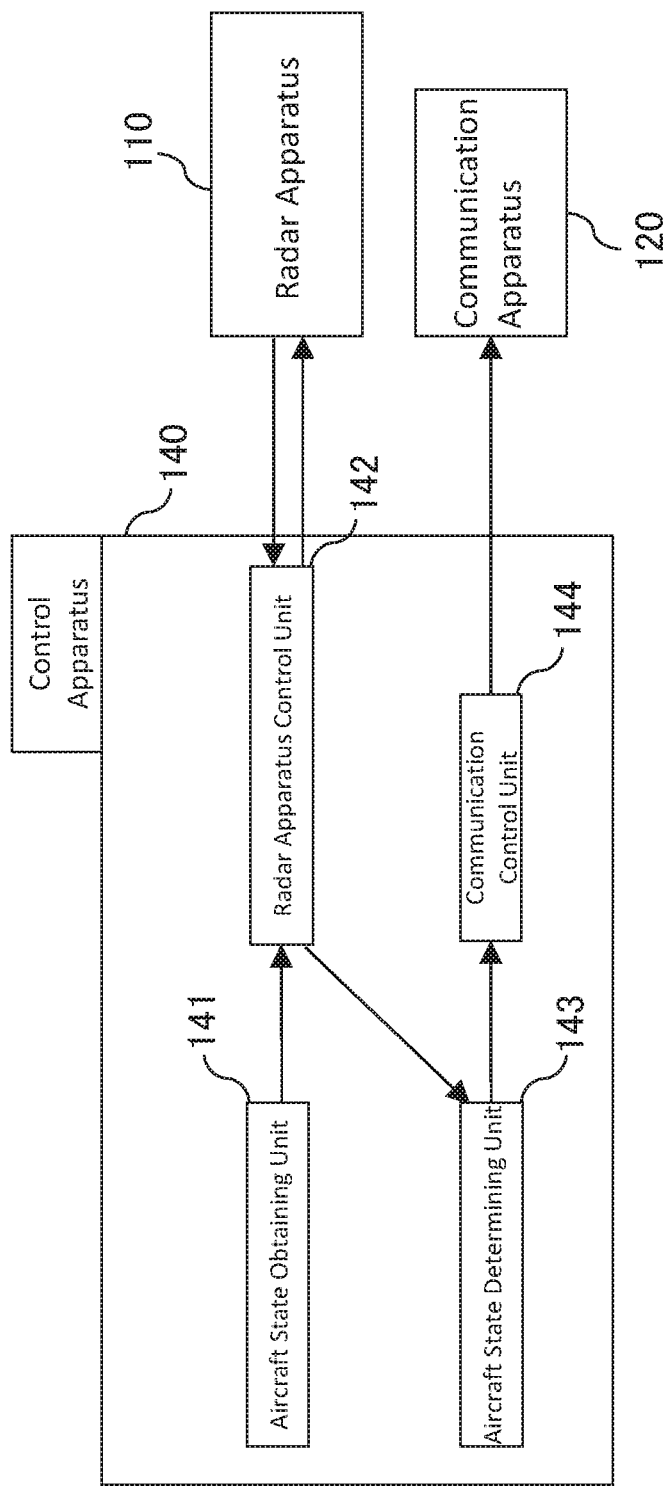
FIG. 4 is a block diagram showing a configuration of a control apparatus according to Embodiment 1.

A configuration of the control apparatus 140 will be described with reference to FIG. 4.

The control apparatus 140 includes an aircraft state obtaining unit 141, a radar apparatus control unit 142, an aircraft state determining unit 143, and a communication control unit 144.

The aircraft state obtaining unit 141 obtains the current aircraft state of the aircraft 500.

The radar apparatus control unit 142 receives a signal from the radar apparatus 110. The radar apparatus control unit 142 generates a control signal that changes the directivity of the radar apparatus according to the aircraft state obtained by the aircraft state obtaining unit 141, and transmits the generated control signal to the radar apparatus 110.

The aircraft state determining unit 143 determines an aircraft state based on the information from the radar apparatus control unit 142. For example, if information indicating that the aircraft 500 is approaching an obstacle is received from the radar apparatus control unit 142, the aircraft state determining unit 143 transmits, to the communication control unit 144, an aircraft state indicating that the aircraft 500 should stop.

The communication control unit 144 controls a communication signal transmitted to other aircraft, GSE, and the control tower via the communication apparatus 120.

1-2. ON/OFF Control of Radar Apparatus

Radar ON/OFF control will be described.

Radar ON/OFF control refers to switching the radar apparatus 110 between on and off based on the aircraft state that indicates, for example, whether the aircraft 500 is on the ground or in flight in the case where the use of the frequency band used by the radar apparatus 110 is prohibited in places other than on the ground.

For example, the control apparatus 140 turns off the radar apparatus 110 when the aircraft 500 takes off from a runway and leaves from the ground. Also, the control apparatus 140 turns on the radar apparatus 110 when the aircraft 500 makes a landing and touches down on the ground.

With this configuration, it is possible to avoid radiation of radio waves that have a frequency whose use is not permitted in the air.

1-3. Installation Position of Radar Apparatus

Figure 5:
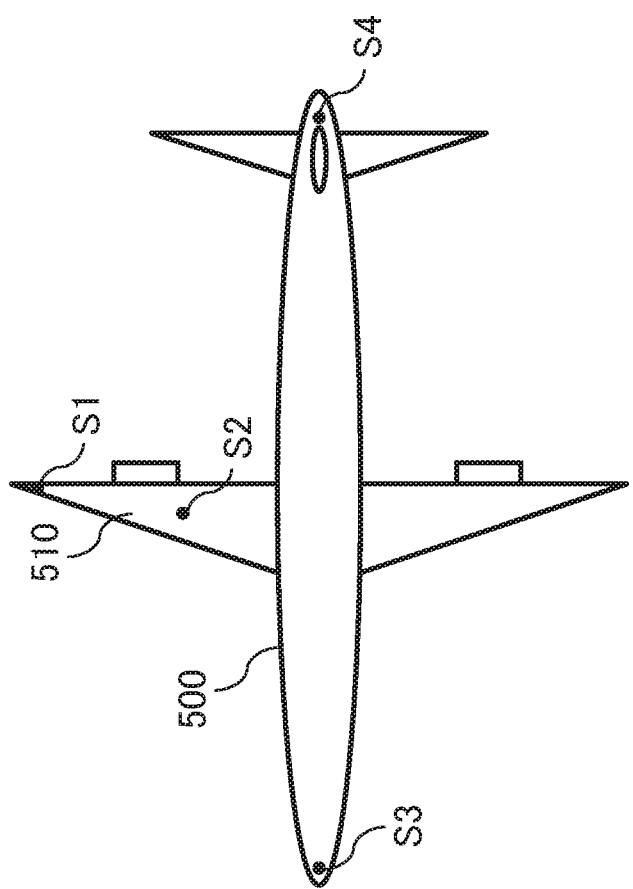
FIG. 5 is a schematic diagram showing examples of installation positions where the radar apparatus can be installed.

Examples of installation positions of the radar apparatus 110 will be described with reference to FIG. 5.

The radar apparatus 110 may be installed at a wing tip (installation position S1) of a main wing 510. With this configuration, it is possible to detect the presence or absence of an obstacle around the wing tip of the main wing 510, the distance between the wing tip of the main wing 510 and the obstacle, and the moving speed of the obstacle. As a result, a contact between the main wing 510 and the obstacle can be avoided.

The radar apparatus 110 may be installed on the root end side (installation position S2) of the main wing 510. With this configuration, it is possible to detect an obstacle in the downward direction in front and back of the main wing 510.

The radar apparatus 110 may be installed in the nose portion (installation position S3). With this configuration, it is possible to detect an obstacle in front of the aircraft 500. It is also possible to detect a foreign object on a runway or a taxiway as the obstacle.

The radar apparatus 110 may be installed in the tail portion (installation position S4). With this configuration, it is possible to detect an obstacle on the back of the aircraft 500. It is also possible to detect a component, machinery or the like that has fallen from the aircraft 500 onto a runway during running on the runway as the obstacle.

Figure 6:
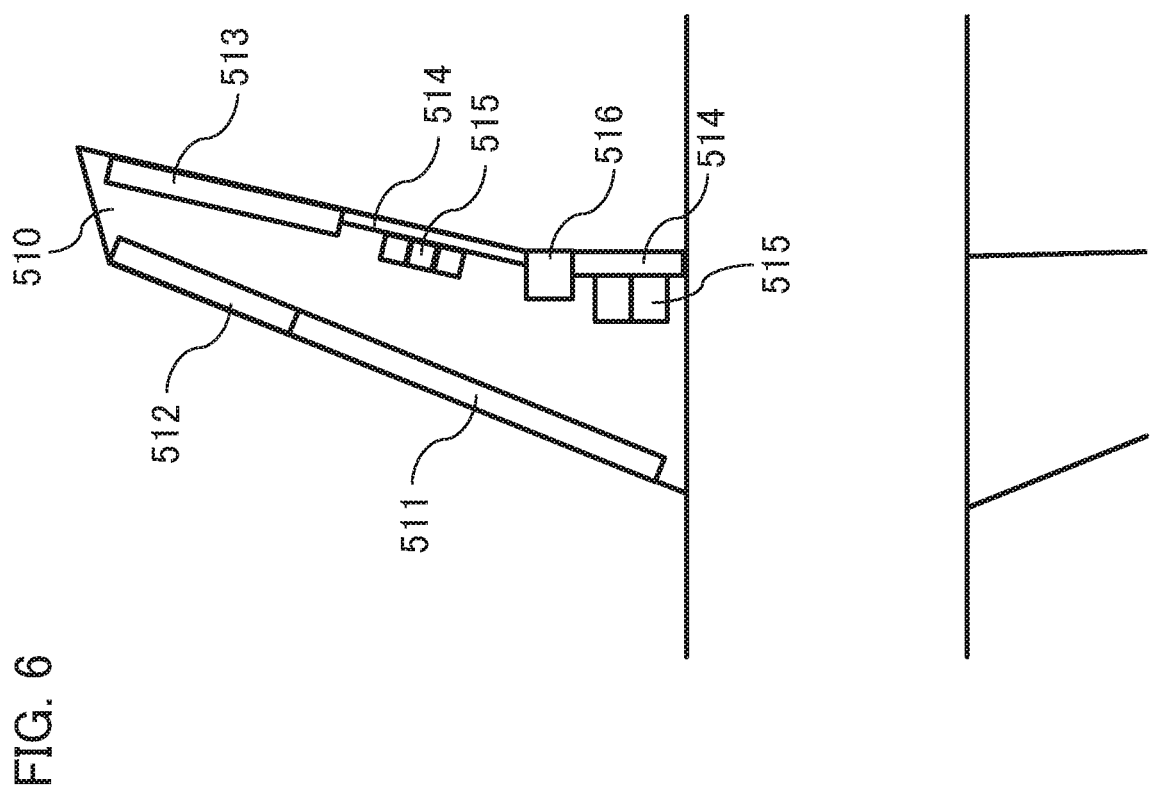
FIG. 6 is a schematic diagram showing a configuration of movable parts of a main wing.

A configuration of movable parts of the main wing 510 will be described with reference to FIG. 6.

The main wing 510 of the aircraft 500 includes, as movable parts, a leading-edge flap 511, a slat 512, a low-speed aileron 513, a flap 514, a spoiler 515, and a high-speed aileron 516. The radar apparatus 110 is installed in a non-movable part of the main wing 510.

The arrangement of the radar apparatus 110 and the slat 512 will be described with reference to FIG. 7.

It is necessary to install the radar apparatus 110 such that its radar coverage is not blocked by the operations of the movable parts. The radar apparatus 110 is installed in the main wing 510 such that, for example, the radar coverage of the radar apparatus is outside the available range of movement of the slat 512.

Examples of installation positions of the radar apparatus 110 will be described with reference to FIG. 8.

The aircraft 500 includes a nose wheel landing gear 521, a main landing gear 522, a jet engine 530, and a tail plane 540.

The radar apparatus 110 may be installed near the nose wheel landing gear 521 (installation position S5). With this configuration, it is possible to detect the presence of an obstacle (for example, a moving body such as GSE) in the downward direction in front of the aircraft 500, and the speed of the moving body. It is also possible to detect a foreign object on a taxiway or a runway as the obstacle.

The radar apparatus 110 may be installed near the main landing gear 522 (installation position S6). With this configuration, it is possible to detect an obstacle below the aircraft 500. It is also possible to detect a foreign object on a taxiway or a runway as the obstacle.

In the case where the radar apparatus 110 is installed in the main landing gear 522, the radar apparatus 110 is housed in the fuselage at the same time when the main landing gear 522 is housed in the fuselage. With this configuration, it is possible to avoid a situation in which the radar apparatus 110 acts as air resistance or is broken or damaged while the aircraft 500 is in flight.

The radar apparatus 110 may be installed near the jet engine 530 (installation position S7). With this configuration, it is possible to detect an obstacle (for example, a moving body such as GSE) near the jet engine 530, and the speed of the moving body.

The radar apparatus 110 may be installed near a tip end of the tail plane 540 (installation position S8). With this configuration, it is possible to detect the presence or absence of an obstacle around the tail plane 540, the distance to the obstacle, and the moving speed of the obstacle. As a result, a contact between the tail plane 540 and the obstacle can be avoided.

1-4. Directivity of Radar Apparatus

Examples of directivity of the radar apparatus will be described with reference to FIGS. 9A, 9B, 10A, and 10B.

Hereinafter, it is assumed that the control apparatus 140 is configured to change the directivity of the radar apparatus 110 based on the aircraft state, and transmit the changed directivity to the radar apparatus 110. However, a configuration is also possible in which the control apparatus 140 transmits the aircraft state to the radar apparatus 110, and the radar apparatus 110 changes the directivity based on the aircraft state.

As shown in FIG. 9A, the control apparatus 140 performs control so as to widen the directivity while the aircraft 500 is taxiing near a gate or on a taxiway. With this configuration, it is possible to detect an obstacle in a wide range although the distance is short.

As shown in FIG. 9B, the control apparatus 140 performs control so as to narrow the directivity while the aircraft 500 is moving at a high speed such as during running on the ground. With this configuration, it is possible to detect an obstacle in a far distance.

Figure 10A:
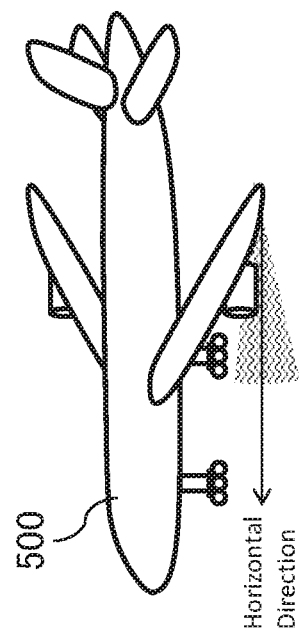
FIG. 10A is a schematic diagram showing an example of directivity of the radar apparatus.

As shown in FIG. 10A, the control apparatus 140 controls the radar apparatus 110 to use a directivity in the horizontal direction while the aircraft 500 is running or taxiing on the ground. With this configuration, it is possible to detect an obstacle at a height close to the aircraft 500.

Figure 10B:
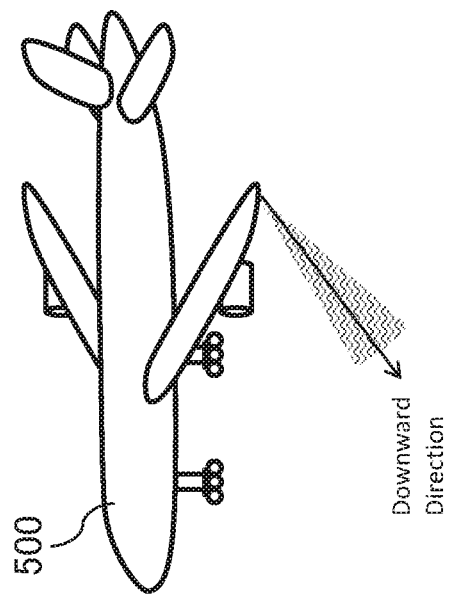
FIG. 10B is a schematic diagram showing an example of directivity of the radar apparatus.

As shown in FIG. 10B, the control apparatus 140 controls the radar apparatus 110 to use a directivity in the downward direction while the aircraft 500 is making a landing. With this configuration, it is possible to detect, as the obstacle, a foreign object on a runway while the aircraft 500 is making a landing.

1-5. Display Form

The display forms of the display apparatus 130 will be described with reference to FIGS. 11A to 11D.

Figure 11A:
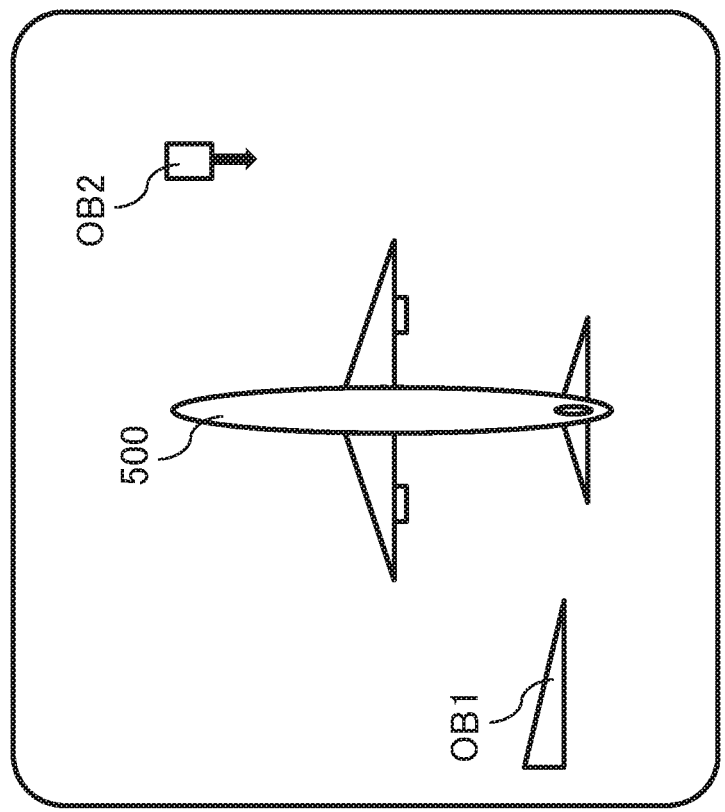
FIG. 11A is a schematic diagram showing an example of a display form of a display apparatus.

As shown in FIG. 11A, the aircraft 500, and an obstacle OB1 and an obstacle OB2 that have been detected by the radar apparatus 110 may be displayed on a display screen of the display apparatus 130. If, for example, the radar apparatus 110 can detect the shape of the obstacle OB1, the shape of the obstacle OB1 is also shown. If, for example, the obstacle OB2 is moving, movement information (the arrow in the diagram) that indicates the direction of movement is also shown.

With this configuration, the pilot of the aircraft 500 can visually recognize the positional relationship between the aircraft 500 and the obstacles, and the obstacle movement information.

As an example of display of the movement information, the display color, contrast, size, and blinking rate of the movement information may be changed according to the moving speed. As a result, the pilot of the aircraft 500 can intuitively perceive information regarding the movement of the obstacle.

As shown in FIG. 11B, the aircraft 500, and auxiliary lines that indicate the width between the wing tips of the main wings 510 of the aircraft 500 may be displayed on the display screen of the display apparatus 130. With this configuration, the pilot of the aircraft 500 can perceive in advance the possibility that the wing tips of the aircraft 500 will come into contact with the obstacle OB1 or the obstacle OB2 when the aircraft 500 moves forward or backward.

Figure 11C:
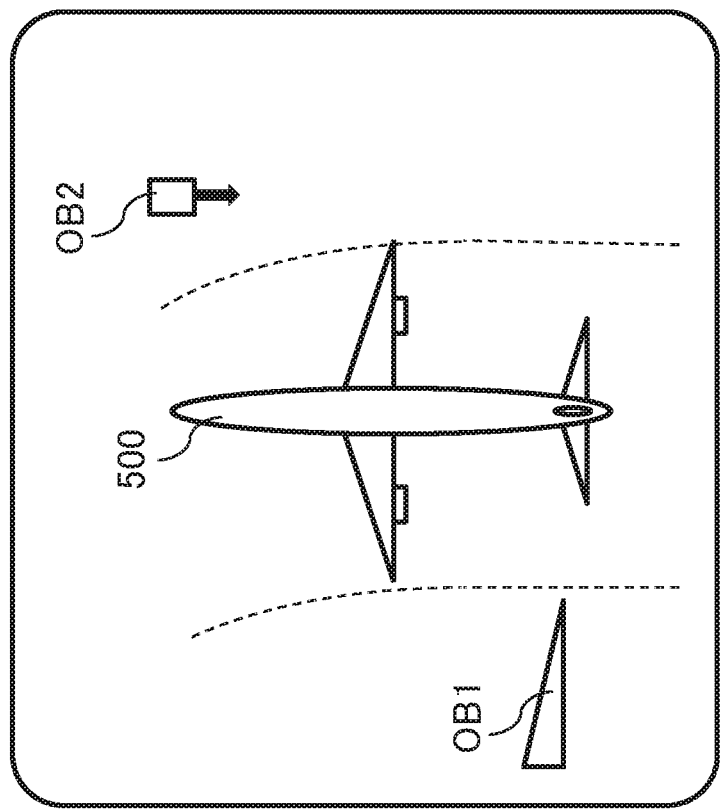
FIG. 11C is a schematic diagram showing an example of a display form of the display apparatus.

As shown in FIG. 11C, the displayed auxiliary lines may be curved according to the steering state of the aircraft 500.

As shown in FIG. 11D, it is also possible to display auxiliary lines that indicate the width between the wing tips of the tail plane 540. With this configuration, the pilot of the aircraft 500 can be visually aware of the possibility of contact with the obstacles.

1-6. Communication Form

Figure 12:
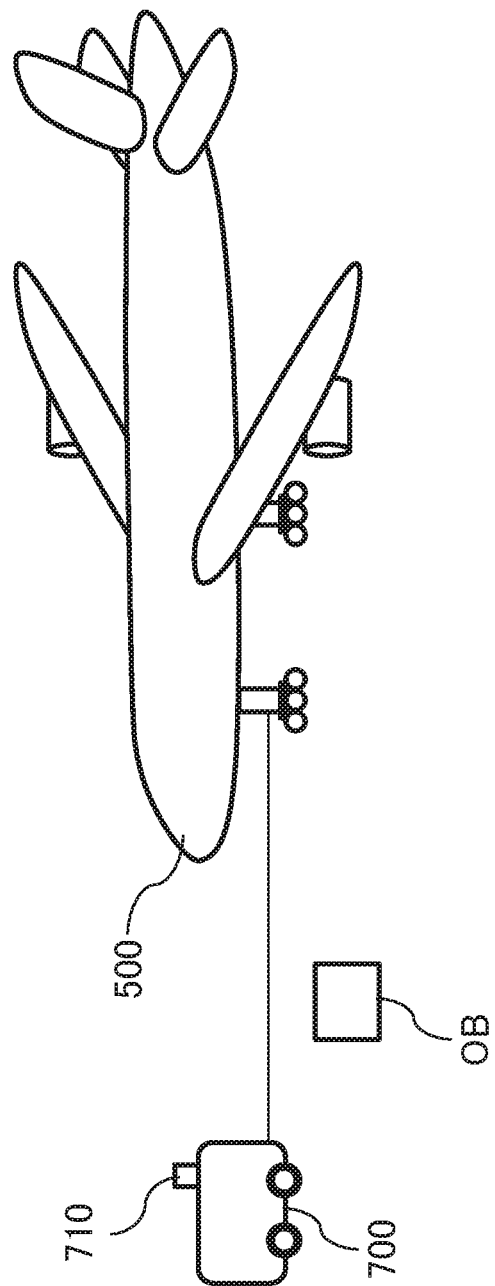
FIG. 12 is a schematic diagram showing a communication form of a communication apparatus.

A communication form of the communication apparatus 120 will be described with reference to FIG. 12.

For example, the aircraft 500 is pushed backward by a towing car 700. At this time, a communication apparatus 710 included in the towing car 700 is configured to be capable of communication with the communication apparatus 120 of the aircraft 500.

The control apparatus 140 determines, based on the positional relationship between the aircraft 500 and an obstacle OB, and the moving speed of the aircraft 500, whether the pushback movement of the aircraft 500 should be continued or stopped. If it is determined that the pushback movement of the aircraft 500 should be stopped, the control apparatus 140 transmits a stop signal to the towing car 700 via the communication apparatus 120. The communication apparatus 710 of the towing car 700 receives the stop signal to stop the pushback movement of the towing car 700 for the aircraft 500. With this configuration, it is possible to avoid a situation in which the aircraft 500 comes into contact with the obstacle OB.

If the obstacle OB is a moving body such as GSE, and the moving body includes a communication apparatus, the control apparatus 140 may transmit a signal to the obstacle. At this time, by transmitting a signal that indicates that the aircraft 500 is approaching the obstacle OB, or a signal that prompts the obstacle OB to move to another place, it is possible to avoid a collision between the aircraft 500 and obstacle OB.

Also, the control apparatus 140 may transmit the obstacle information of the radar apparatus 110 to the control tower or another airport facility via the communication apparatus 120. With this configuration, the control tower or the airport facility to which the obstacle information has been transmitted can transmit information to moving bodies or other aircraft that are managed by the control tower or the airport facility, informing that the aircraft 500 is approaching the moving bodies or other aircraft.

Also, in the case where the aircraft 500 includes a plurality of radar apparatuses 110, the control apparatus 140 may change the transmission destination of the obstacle information for each radar apparatus 110.

Also, the control apparatus 140 may change the transmission destination of the obstacle information for each direction of the obstacle included in the obstacle information of the radar apparatus 110. For example, if there is an obstacle in the downward direction, the control apparatus 140 may transmit information indicative of the presence of the obstacle in the downward direction to GSE present in the surroundings. If there is an obstacle in the horizontal direction, the control apparatus 140 may transmit information indicative of the presence of the obstacle in the horizontal direction to the pilot or the control tower.

2. Embodiment 2

2-1. Configuration of Radar Detection System

Figure 13:
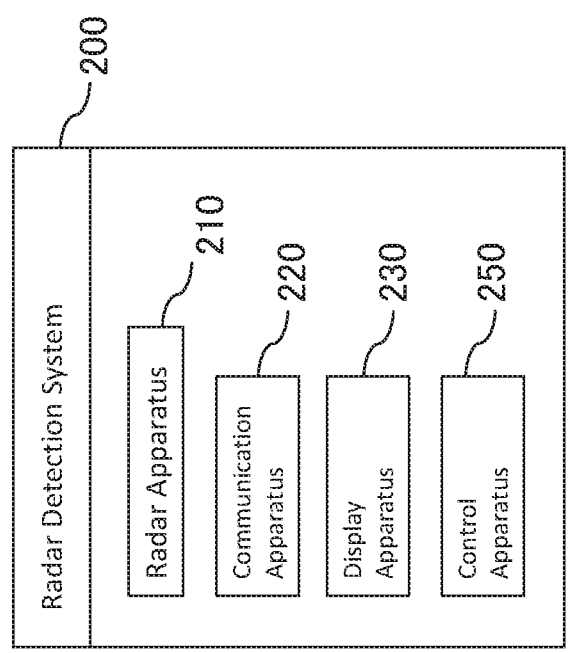
FIG. 13 is a block diagram showing a configuration of a radar detection system according to Embodiment 2.

A configuration of a radar detection system 200 will be described with reference to FIG. 13.

The radar detection system 200 includes a radar apparatus 210, a communication apparatus 220, a display apparatus 230, and a control apparatus 250.

2-2. (Three-Dimensional) Radar Apparatus

The radar apparatus 210 detects the presence or absence of an obstacle by using three-dimensional radar, and acquires obstacle information if the presence of an obstacle is detected. In Embodiment 2, the obstacle information includes the content of the obstacle information of Embodiment 1, and at least the height of the obstacle. The communication apparatus 220 and the display apparatus 230 have the same configurations as those of the communication apparatus 120 and the display apparatus 130 of Embodiment 1, and thus a description thereof is omitted here.

2-3. Control Apparatus

Figure 14:
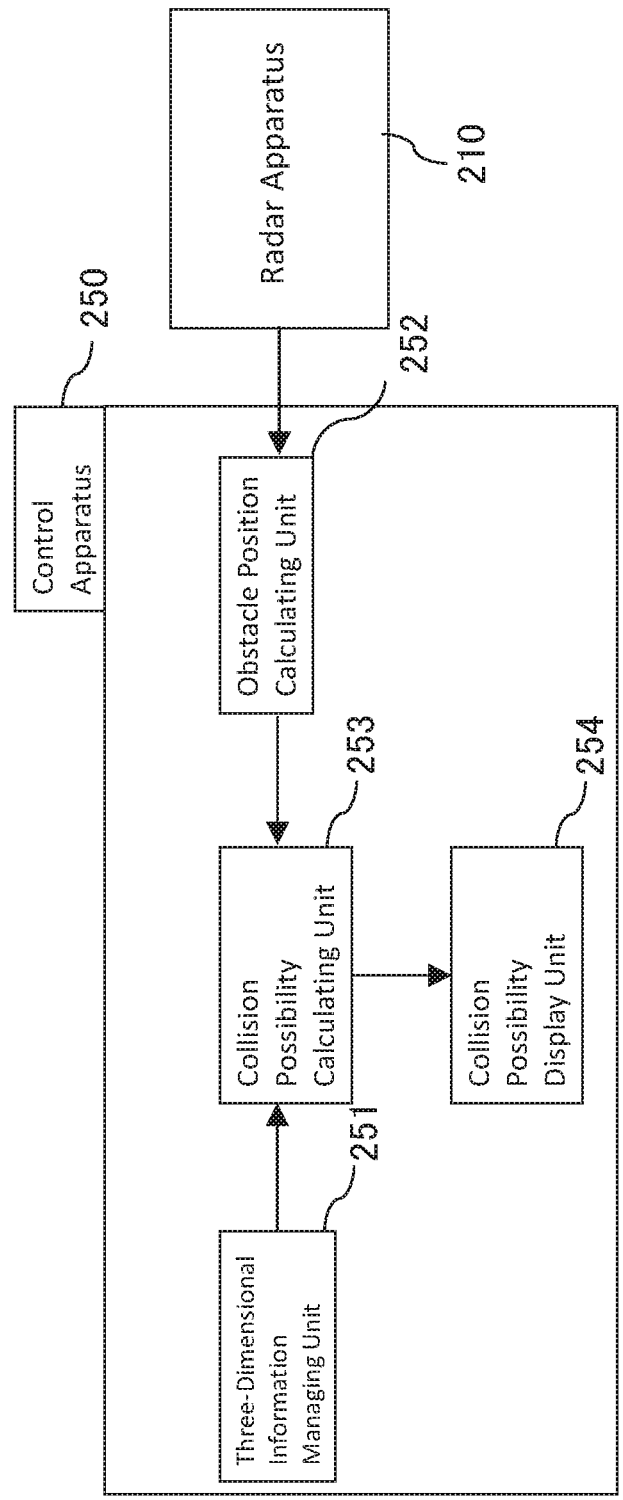
FIG. 14 is a block diagram showing a configuration of a control apparatus according to Embodiment 2.

A configuration of the control apparatus 250 will be described with reference to FIG. 14.

The control apparatus 250 is a processor or a circuit that executes processing in accordance with a predetermined program. The control apparatus 250 predicts a collision with the obstacle detected by the radar apparatus 210. The control apparatus 250 includes a three-dimensional information managing unit 251, an obstacle position calculating unit 252, a collision possibility calculating unit 253, and a collision possibility display unit 254.

Figure 15:
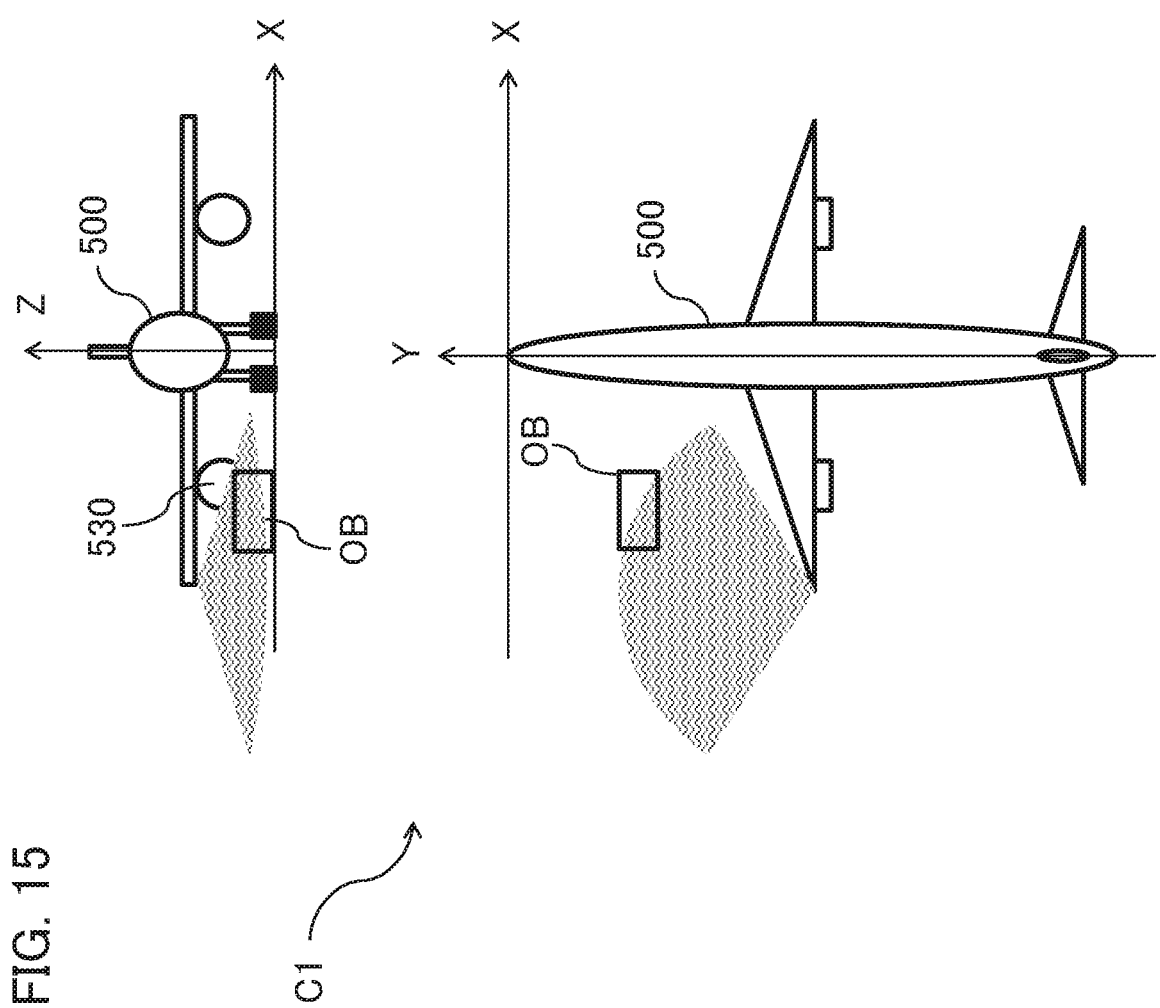
FIG. 15 is a block diagram showing an operation of the radar detection system according to Embodiment 2.

The three-dimensional information managing unit 251 manages an aircraft coordinate system C1 (see FIG. 15). The aircraft coordinate system C1 is stored in advance in the three-dimensional information managing unit 251.

The aircraft coordinate system C1 is a representation of the aircraft 500 in a three-dimensional coordinate system. In the aircraft coordinate system C1, the X and Y coordinates may be based on, for example, the center of the tip of the nose of the aircraft 500, and the Z coordinate of the aircraft coordinate system C1 may be based on the horizontal plane. If it is possible to calculate the positional relationship between the aircraft 500 and the obstacle, the aircraft coordinate system C1 may be a polar coordinate system.

The obstacle position calculating unit 252 calculates the position of the obstacle in the aircraft coordinate system C1 based on the obstacle information transmitted from the radar apparatus 210. The obstacle position calculating unit 252 may be configured, as a constituent element of the radar apparatus 210, so as to transmit the position of the obstacle in the aircraft coordinate system C1 to the control apparatus 250.

The collision possibility calculating unit 253 calculates a collision possibility that the aircraft 500 will collide with the obstacle based on the position of the obstacle in the aircraft coordinate system C1.

The collision possibility display unit 254 displays the collision possibility. The collision possibility display unit 254 may display the collision possibility only when the collision possibility is higher than a predetermined value. The collision possibility may be shown, for example, in percentage, in color, using blinking rate, using the size of a display marker, or the like.

As used herein, the term "collision possibility" encompasses, not only the possibility that the aircraft 500 will actually come into contact with the obstacle, but also the possibility that the obstacle will be within a predetermined distance from the aircraft 500. Also, if the obstacle and a portion of the aircraft 500 have similar X and Y coordinates, but different Z coordinates (heights), and the collision possibility is low, the collision possibility display unit 254 may provide an alert display.

2-4. Operation of Radar Detection System

An operation of the radar detection system 200 will be described with reference to FIG. 15.

For example, it is assumed that there is an obstacle OB in the forward lateral direction of the aircraft 500. At this time, the radar apparatus 210 acquires obstacle information that includes the height of the obstacle OB. Then, the control apparatus 250 predicts a collision possibility that the obstacle OB will collide with the jet engine 530 although the obstacle OB will not come into contact with the main wing 510. With this configuration, the pilot can perceive the collision possibility that the aircraft 500 will collide with the obstacle.

3. Embodiment 3

3-1-1. Radar Detection System

Figure 16:
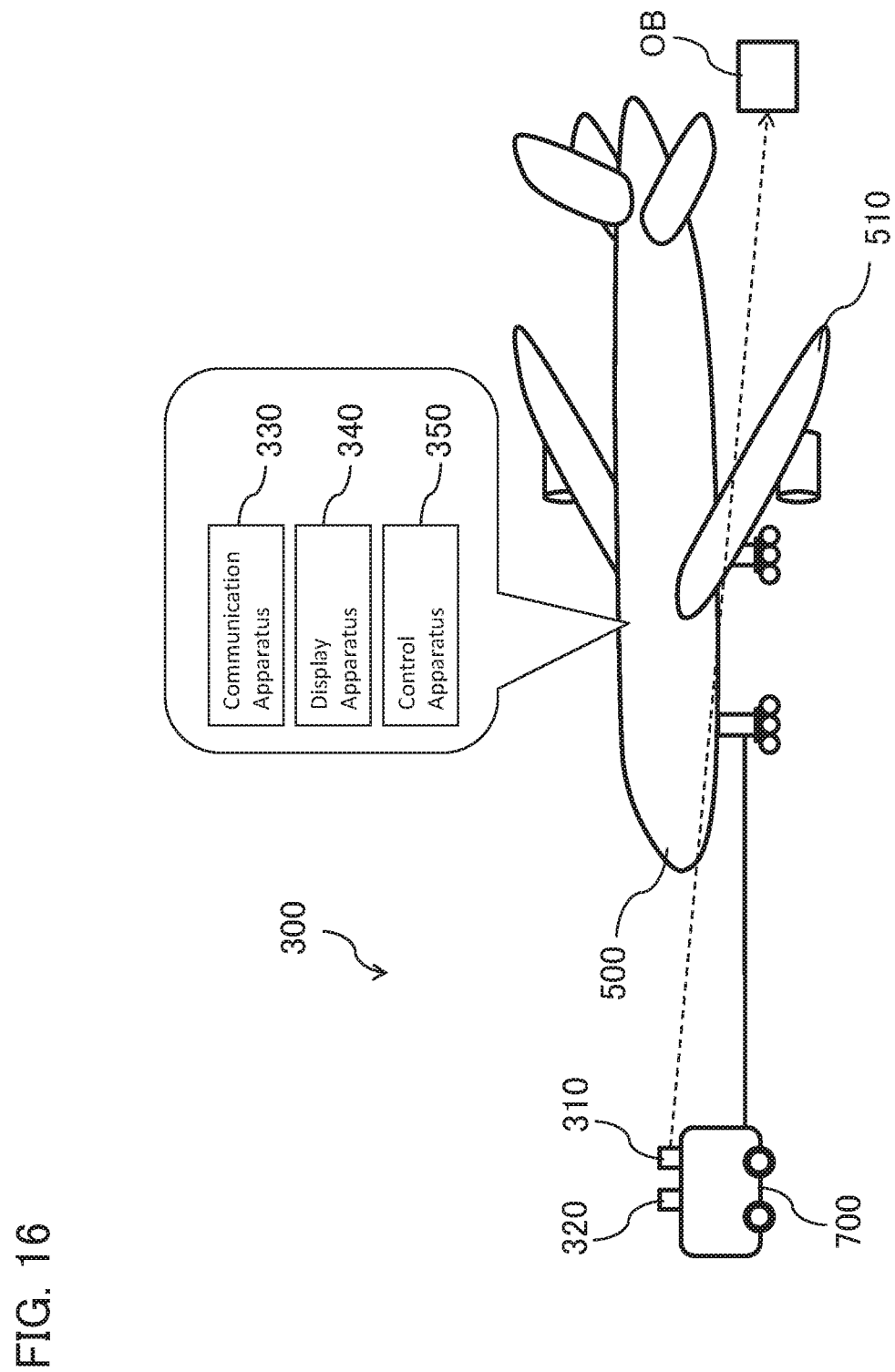
FIG. 16 is a block diagram showing a configuration of a radar detection system according to Embodiment 3.

A configuration of a radar detection system 300 will be described with reference to FIG. 16.

The radar detection system 300 is composed of a radar apparatus 310 included in the towing car 700, a communication apparatus 320 included in the towing car 700, a communication apparatus 330 included in the aircraft 500, a display apparatus 340 included in the aircraft 500, and a control apparatus 350 included in the aircraft 500.

The radar apparatus 310 detects the presence or absence of an obstacle by using two-dimensional or three-dimensional radar, and acquires obstacle information if the presence of an obstacle is detected. The radar apparatus 310 transmits the obstacle information to the communication apparatus 320. In Embodiment 3, the obstacle information may be the same content as that of the obstacle information of Embodiment 1, or may include the content of the obstacle information of Embodiment 1, and at least the height of the obstacle. The radar coverage includes the wing tips of the main wings 510 where the possibility of contact with an obstacle is high.

The communication apparatus 320 transmits the obstacle information of the radar apparatus 310 to the communication apparatus 330 of the aircraft 500. The communication apparatus 330 of the aircraft 500 transmits the obstacle information to the control apparatus 350. The control apparatus 350 manages the aircraft state based on the obstacle information. The communication apparatus 320 may transmit the obstacle information to the control tower.

A description will be given of an operation performed when, for example, the radar apparatus 310 detects an obstacle OB on the back of the main wing 510 of the aircraft 500. The radar apparatus 310 transmits obstacle information regarding the obstacle OB to the communication apparatus 320. The communication apparatus 320 of the towing car 700 transmits the obstacle information to the communication apparatus 330 of the aircraft 500. The communication apparatus 330 transmits the received obstacle information to the control apparatus 350. The control apparatus 350 displays the obstacle information on the display apparatus 340. With this configuration, the pilot of the aircraft 500 can perceive the presence of the obstacle OB in the surroundings of the aircraft 500.

3-1-2. Directivity of Radar Apparatus

Examples of directivity of the radar apparatus of the towing car 700 will be described with reference to FIGS. 17A, 17B, and 18.

Figure 17A:
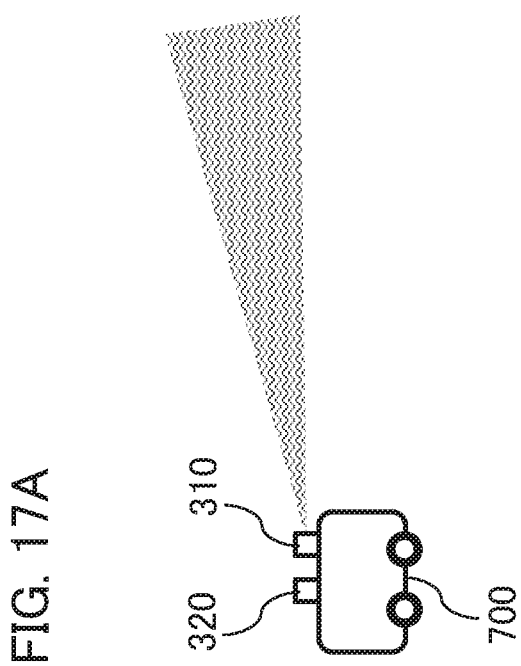
FIG. 17A is a schematic diagram showing an example of directivity of a radar apparatus.

As shown in FIG. 17A, the radar directivity may be directed upward relative to the horizontal direction. With this configuration, the wing tip of the main wing 510 of the aircraft 500 that is located in the upward direction of the towing car 700 can be included in the radar coverage, and thus a contact between the wing tip and the obstacle can be avoided.

Figure 17B:
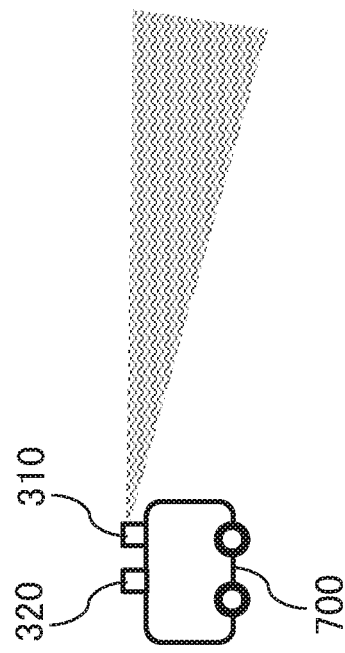
FIG. 17B is a schematic diagram showing an example of directivity of the radar apparatus.

As shown in FIG. 17B, the radar directivity may be directed downward relative to the horizontal direction. With this configuration, it is possible to detect a foreign object on a taxiway.

As shown in FIG. 18, the radar apparatus 310 may change the radar directivity to any of a plurality of directivities in different directions according to the situation. For example, the radar apparatus 310 uses the radar directivity in the upward direction so as to detect an obstacle in the surroundings of the aircraft 500 while the towing car 700 is pushing the aircraft 500 backward or towing the aircraft 500. The radar apparatus 310 uses the radar directivity in the downward direction so as to detect an obstacle on the road surface around the towing car 700 while the towing car 700 is moving by itself. With this configuration, there is no need to provide different radar apparatuses for different directivities in the towing car 700, and it is possible to obtain advantageous effects such as weight reduction and cost reduction of the aircraft 500.

3-2. Variation

The towing car 700 may change the radar directivity according to the communication destination with which the communication apparatus 320 is in communication. For example, if the communication apparatus 320 of the towing car 700 is in communication with the communication apparatus 330 of the aircraft 500, the radar apparatus 310 uses the radar directivity in the upward direction so as to detect an obstacle in the surroundings of the aircraft 500. If, on the other hand, the communication apparatus 320 of the towing car 700 is in communication with a communication apparatus that is provided in the control tower, the radar apparatus 310 uses the radar directivity in the downward direction so as to detect an obstacle around the towing car 700.

The towing car 700 may obtain position information regarding the position of the towing car 700, and change the radar directivity based on the position of the towing car 700. For example, if the towing car 700 is on a taxiway or near a gate, the radar apparatus 310 uses the radar directivity in the upward direction so as to detect an obstacle in the surroundings of the aircraft that is on the taxiway or near the gate. If, on the other hand, the towing car 700 is in a location where there is no aircraft (for example, on a road that is dedicated to GSE, near a hangar where GSE is housed, or the like), the radar apparatus 310 uses the radar directivity in the downward direction so as to detect an obstacle in the surroundings of the towing car 700.

Also, if the towing car 700 is in a location (for example, near a gate) where there are an aircraft, GSE, and a plurality of airport ground staff members, by changing the radar directivity between the upward direction and the downward direction every predetermined length of time, it is possible to detect an obstacle around the aircraft and an obstacle around the towing car 700.

4. Embodiment 4

A configuration of an airport AP will be described with reference to FIG. 19.

In the airport AP, there are a plurality of first aircrafts 500, a plurality of second aircrafts 600, and a control tower 800. The first aircrafts 500 and the second aircrafts 600 are parking or taxiing in the airport AP.

4-1. Radar detection system

Figure 20:
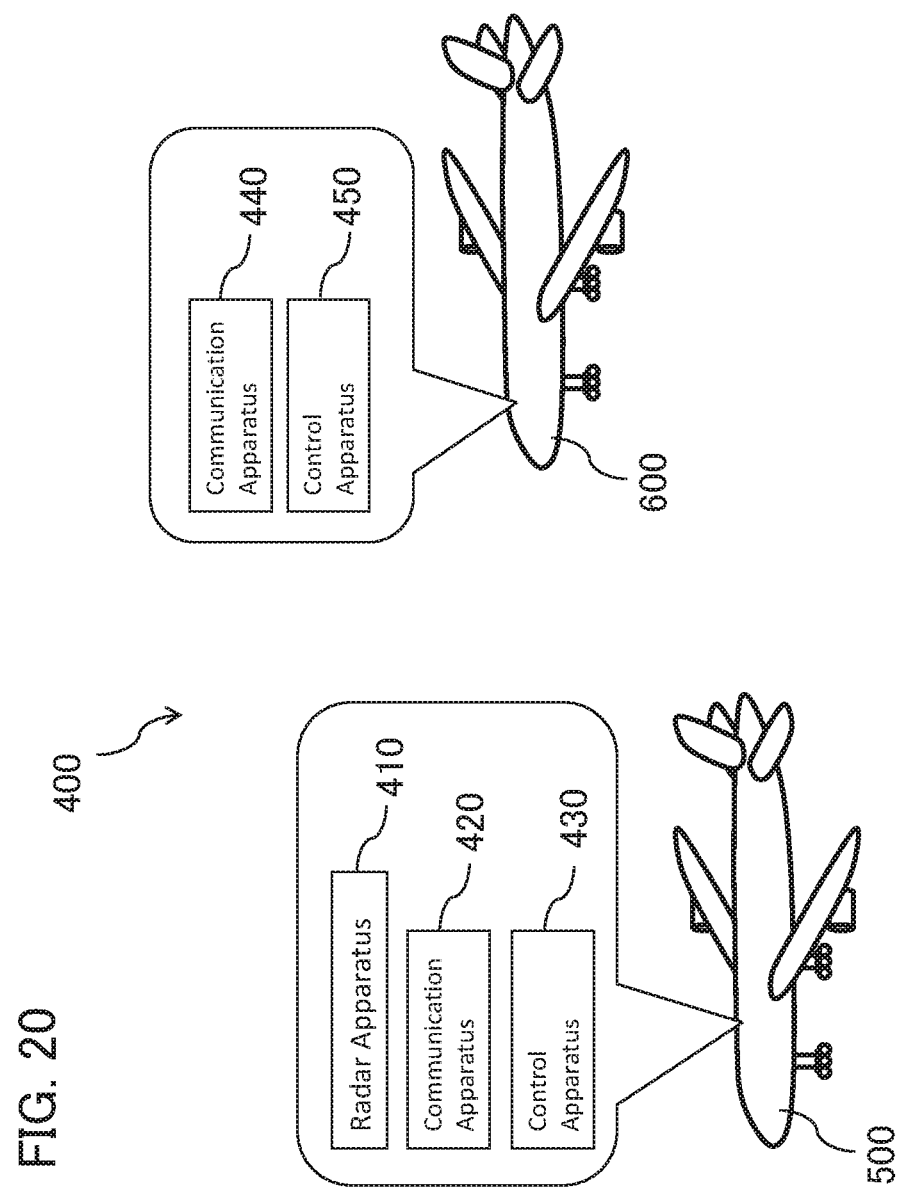
FIG. 20 is a block diagram showing a configuration of a radar detection system according to Embodiment 4.

A configuration of a radar detection system 400 will be described with reference to FIG. 20.

The radar detection system 400 is composed of a radar apparatus 410 included in a first aircraft 500, a communication apparatus 420 included in the first aircraft 500, a control apparatus 430 included in the first aircraft 500, a communication apparatus 440 included in a second aircraft 600, and a control apparatus 450 included in the second aircraft 600.

The first aircraft 500 detects an obstacle in the airport AP, acquires obstacle information, and transmits the obstacle information to the second aircraft 600.

The radar apparatus 410 of the first aircraft 500 detects the presence or absence of an obstacle by using three-dimensional radar, and acquires obstacle information if the presence of an obstacle is detected. In Embodiment 4, the obstacle information includes the content of the obstacle information of Embodiment 1, and at least the height of the obstacle. The communication apparatus 420 of the first aircraft 500 is an apparatus that performs wireless communication with the second aircraft 600.

The second aircraft 600 receives the obstacle information from the first aircraft 500, and predicts a collision of the second aircraft 600 with the obstacle. The communication apparatus 440 of the second aircraft 600 is an apparatus that performs wireless communication with the first aircraft 500.

4-1-1. Control Apparatus (First Aircraft)

Figure 21:
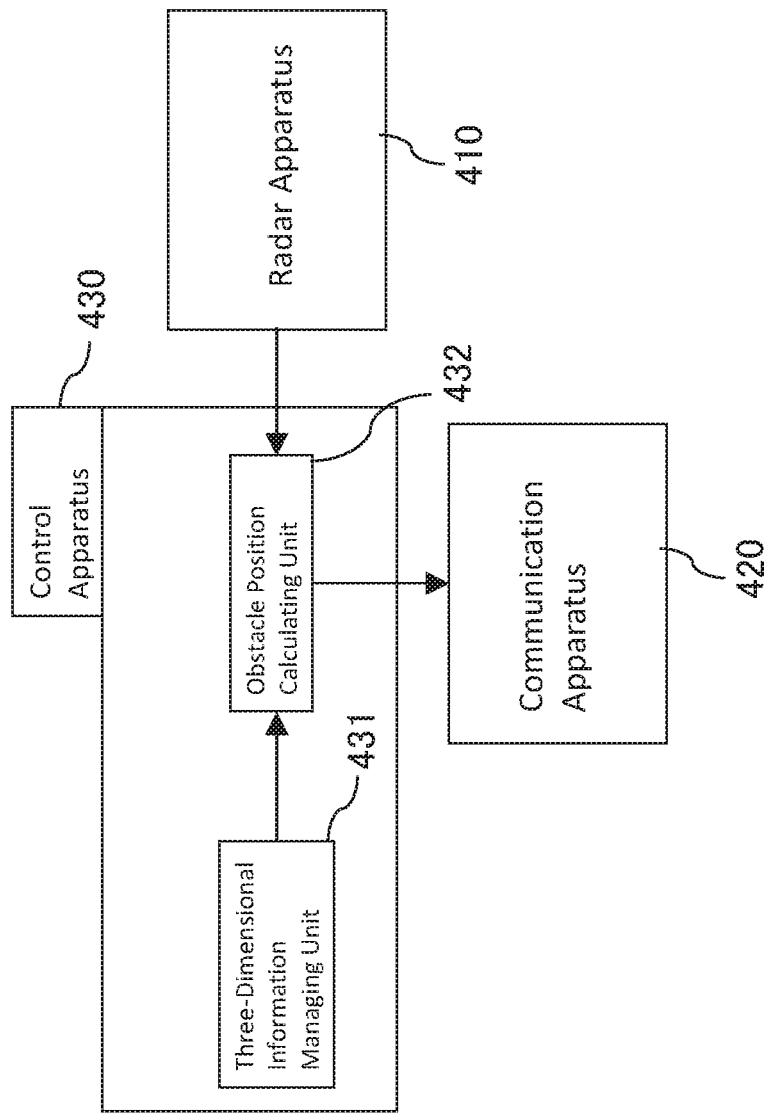
FIG. 21 is a block diagram showing a configuration of a control apparatus included in a first aircraft according to Embodiment 4.

A configuration of the control apparatus 430 included in the first aircraft 500 will be described with reference to FIG. 21.

The control apparatus 430 is a processor or a circuit that executes processing in accordance with a predetermined program. The control apparatus 430 detects the position of an obstacle in an airport coordinate system C2 based on the obstacle information detected by the radar apparatus 410. The airport coordinate system C2 is a representation of the airport AP in a coordinate system whose origin is set to a predetermined position in the airport AP. The predetermined position may be, for example, the control tower 800. The control apparatus 430 includes a three-dimensional information managing unit 431, and an obstacle position calculating unit 432.

The three-dimensional information managing unit 431 manages the airport coordinate system C2 (not shown). The airport coordinate system C2 is stored in advance in the three-dimensional information managing unit 431.

The obstacle position calculating unit 432 calculates an obstacle position in the airport coordinate system C2 based on the obstacle information acquired by the radar apparatus 410, and the airport coordinate system C2 managed by the three-dimensional information managing unit 431. The obstacle position in the airport coordinate system C2 is transmitted to the communication apparatus 420.

4-1-2. Control Apparatus (Second Aircraft)

Figure 22:
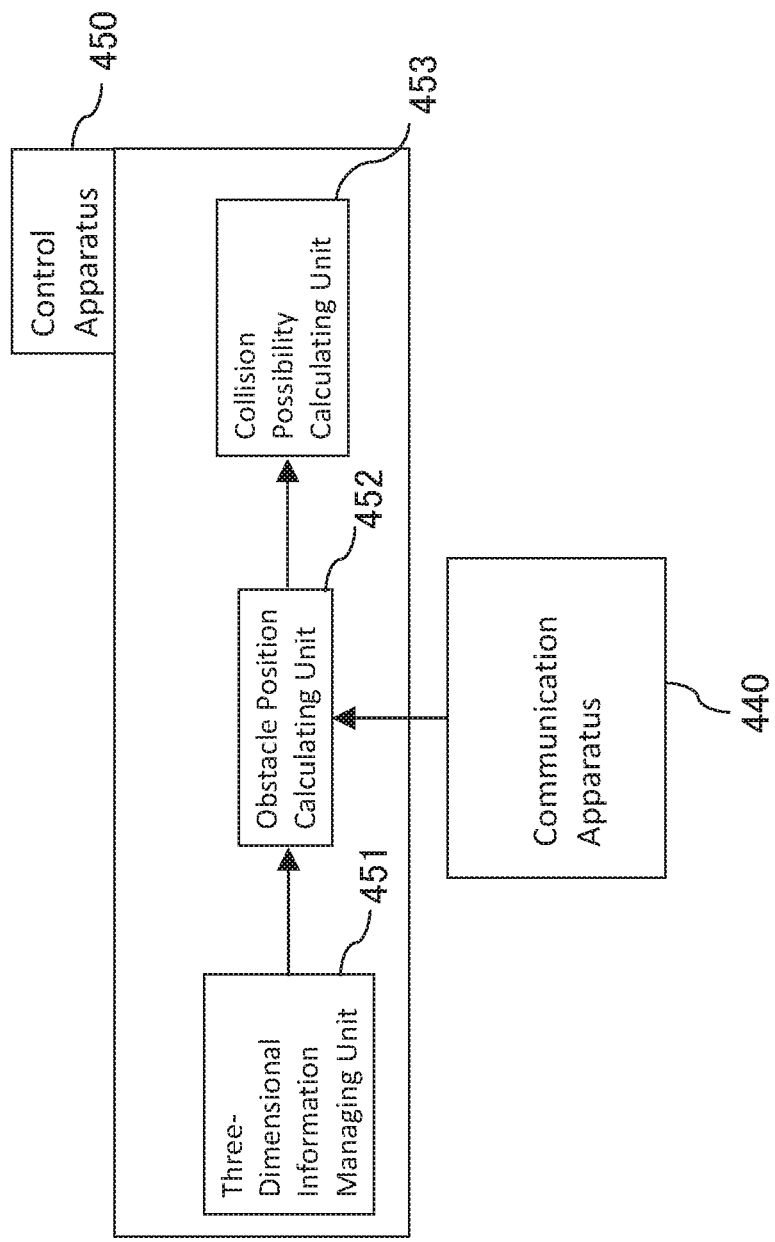
FIG. 22 is a block diagram showing a configuration of a control apparatus included in a second aircraft according to Embodiment 4.

A configuration of the control apparatus 450 included in the second aircraft 600 will be described with reference to FIG. 22.

The control apparatus 450 is a processor or a circuit that executes processing in accordance with a predetermined program. The control apparatus 450 calculates a possibility that the second aircraft 600 will collide with the obstacle. The control apparatus 450 includes a three-dimensional information managing unit 451, an obstacle position calculating unit 452, and a collision possibility calculating unit 453.

The three-dimensional information managing unit 451 manages the airport coordinate system C2. The airport coordinate system C2 is stored in advance in the three-dimensional information managing unit 451.

The obstacle position calculating unit 452 calculates the position of the second aircraft 600 and the position of the obstacle in the airport coordinate system C2, based on the airport coordinate system C2 and the obstacle position in the airport coordinate system C2 that is transmitted from the communication apparatus 440.

The collision possibility calculating unit 453 calculates a collision possibility that the second aircraft 600 will collide with the obstacle based on the position of the second aircraft 600 and the position of the obstacle in the airport coordinate system C2.

4-1-3. Advantageous Effect

With this configuration, the radar detection system 400 can predict a collision between the second aircraft 600 and the obstacle. The control apparatus 430 of the first aircraft 500 may be configured to calculate a collision possibility that the first aircraft 500 and the obstacle will collide based on the airport coordinate system C2, and the obstacle information.

4-2. Variation

Figure 23:
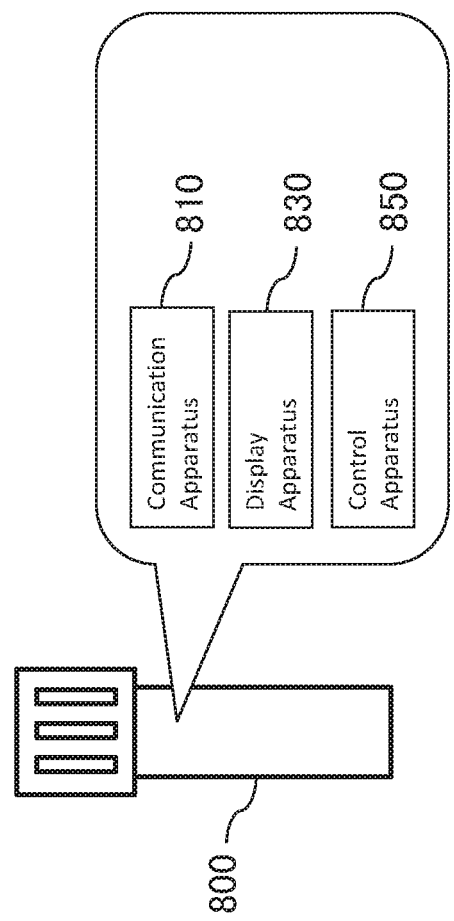
FIG. 23 is a block diagram showing a configuration of a control tower according to a variation.

A variation of the radar detection system 400 will be described with reference to FIG. 23.

In the radar detection system 400, the airport coordinate system C2 may be stored in the control tower 800. To be specific, the control tower 800 includes a communication apparatus 810, a display apparatus 830, and a control apparatus 850.

The communication apparatus 810 is an apparatus that performs wireless communication with the communication apparatus 420 of the first aircraft 500 and the communication apparatus 440 of the second aircraft 600. The communication apparatus 810 receives an obstacle position in the airport coordinate system C2 from the communication apparatus 420 of the first aircraft 500, and transmits the obstacle position in the airport coordinate system C2 to the communication apparatus 440 of the second aircraft 600.

The control apparatus 850 is a processor or a circuit that executes processing in accordance with a predetermined program. The control apparatus 850 includes the airport coordinate system C2 that has been stored in advance. The control apparatus 850 updates the obstacle position in the airport coordinate system C2 based on the obstacle position in the airport coordinate system C2 transmitted from the communication apparatus 810.

The display apparatus 830 displays the obstacle position in the airport coordinate system C2 updated by the control apparatus 850 in a map. The map is shown, for example, in a plan view of the airport.

With this configuration, an air traffic controller can perceive the position of the obstacle in the airport. As a result, the frequency of accidental contact between aircraft and obstacles can be reduced.

What is claimed is:

1. A radar detection system that detects an obstacle to an aircraft in an airport where a first aircraft and a second aircraft take off and make a landing, the radar detection system comprising:

a radar apparatus that is provided in the first aircraft, and is configured to detect an obstacle by transmitting and receiving a radar signal in a three-dimensional range, and acquire obstacle information regarding the obstacle based on the received radar signal, the obstacle information including at least a height of the obstacle;

a first control apparatus that is provided in the first aircraft, includes an airport coordinate system whose origin is set to a predetermined position in the airport, and is configured to calculate a position of the obstacle in the airport coordinate system based on the obstacle information and the airport coordinate system;

a first communication apparatus that is provided in the first aircraft, and is configured to transmit the position of the obstacle in the airport coordinate system;

a second communication apparatus that is provided in the second aircraft, and is configured to receive the position of the obstacle in the airport coordinate system from the first communication apparatus; and a second control apparatus that is provided in the second aircraft, and is configured to calculate a possibility that the second aircraft will collide with the obstacle based on a position of the second aircraft in the airport coordinate system, and the position of the obstacle in the airport coordinate system.

2. The radar detection system according to claim 1, wherein
the first control apparatus is configured to change directivity of the radar apparatus based on an aircraft state of the first aircraft.

3. The radar detection system according to claim 2, wherein the first control apparatus is configured to control the directivity to be horizontal, and
the first control apparatus uses a first directivity while the first aircraft is taxiing, and uses a second directivity that is different from the first directivity while the first aircraft is running.

4. The radar detection system according to claim 3, wherein the first control apparatus is configured to use a wide directivity as the first directivity, and uses a narrow directivity as the second directivity.

5. A radar detection system that detects an obstacle to an aircraft in an airport where a control tower is provided, and where a first aircraft and a second aircraft take off and make a landing, the radar detection system comprising:
a radar apparatus that is provided in the first aircraft, and is configured to detect an obstacle by transmitting and receiving a radar signal in a three-dimensional range, and acquire obstacle information regarding the obstacle based on the received radar signal, the obstacle information including at least a height of the obstacle;
a first control apparatus that is provided in the first aircraft, includes an airport coordinate system whose origin is set to a predetermined position in the airport, and is configured to calculate a position of the obstacle in the airport coordinate system based on the obstacle information and the airport coordinate system;
a first communication apparatus that is provided in the first aircraft, and is configured to transmit the position of the obstacle in the airport coordinate system;
a second communication apparatus that is provided in the control tower, and is configured to receive the position of the obstacle in the airport coordinate system from the first communication apparatus, and transmit the position of the obstacle in the airport coordinate system;
a display apparatus that is provided in the control tower, and is configured to display the position of the obstacle in the airport coordinate system;
a third communication apparatus that is provided in the second aircraft, and is configured to receive the position of the obstacle in the airport coordinate system from the second communication apparatus; and a second control apparatus that is provided in the second aircraft, and is configured to calculate a possibility that the second aircraft will collide with the obstacle based on a position of the second aircraft in the airport coordinate system, and the position of the obstacle in the airport coordinate system.

6. The radar detection system according to claim 5, wherein
the first control apparatus is configured to change directivity of the radar apparatus based on an aircraft state of the first aircraft.

7. The radar detection system according to claim 6, wherein the first control apparatus is configured to control the directivity to be horizontal, and
the first control apparatus uses a first directivity while the first aircraft is taxiing, and uses a second directivity that is different from the first directivity while the first aircraft is running.

8. The radar detection system according to claim 7, wherein the first control apparatus is configured to use a wide directivity as the first directivity, and uses a narrow directivity as the second directivity.

9. A radar detection method of detecting an obstacle to an aircraft in an airport where a first aircraft and a second aircraft take off and make a landing, the radar detection method comprising:
detecting, by a radar apparatus provided in the first aircraft, an obstacle by transmitting and receiving a radar signal in a three-dimensional range;
acquiring, by the radar apparatus provided in the first aircraft, obstacle information regarding the obstacle based on the received radar signal, the obstacle information including at least a height of the obstacle;
calculating, by a first control apparatus provided in the first aircraft, a position of the obstacle in an airport coordinate system based on the obstacle information and the airport coordinate system, the first control apparatus including the airport coordinate system whose origin is set to a predetermined position in the airport;
transmitting, by a first communication apparatus provided in the first aircraft, the position of the obstacle in the airport coordinate system;
receiving, by a second communication apparatus provided in the second aircraft, the position of the obstacle in the airport coordinate system from the first communication apparatus; and
calculating, by a second control apparatus provided in the second aircraft, a possibility that the second aircraft will collide with the obstacle based on a position of the second aircraft in the airport coordinate system and the position of the obstacle in the airport coordinate system.

10. A radar detection method of detecting an obstacle to an aircraft in an airport where a control tower is provided, and where a first aircraft and a second aircraft take off and make a landing, the radar detection method comprising:
detecting, by a radar apparatus provided in the first aircraft, an obstacle by transmitting and receiving a radar signal in a three-dimensional range;
acquiring, by the radar apparatus provided in the first aircraft, obstacle information regarding the obstacle based on the received radar signal, the obstacle information including at least a height of the obstacle;
calculating, by a first control apparatus provided in the first aircraft, a position of the obstacle in the airport coordinate system based on the obstacle information and an airport coordinate system, the first control apparatus including the airport coordinate system whose origin is set to a predetermined position in the airport;

transmitting, by a first communication apparatus provided in the first aircraft, the position of the obstacle in the airport coordinate system;

receiving, by a second communication apparatus provided in the control tower, the position of the obstacle in the airport coordinate system from the first communication apparatus;

displaying, on a display apparatus provided in the control tower, the position of the obstacle in the airport coordinate system;

transmitting, by the second communication apparatus provided in the control tower, the position of the obstacle in the airport coordinate system;

receiving, by a third communication apparatus provided in the second aircraft, the position of the obstacle in the airport coordinate system from the second communication apparatus; and calculating, by a second control apparatus provided in the second aircraft, a possibility that the second aircraft will collide with the obstacle based on a position of the second aircraft in the airport coordinate system and the position of the obstacle in the airport coordinate system.

* * * * *